(12) United States Patent
Takeshita et al.

(10) Patent No.: US 8,921,000 B2
(45) Date of Patent: Dec. 30, 2014

(54) FUEL CELL

(75) Inventors: Naohiro Takeshita, Toyota (JP); Hitoshi Hamada, Gotemba (JP); Masayuki Ito, Susono (JP); Atsushi Ida, Nissin (JP); Haruyuki Aono, Susono (JP); Norishige Konno, Toyota (JP); Takashi Kajiwara, Gotemba (JE); Tomoyuki Takamura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 38 days.

(21) Appl. No.: 13/807,154

(22) PCT Filed: Jul. 15, 2010

(86) PCT No.: PCT/JP2010/004609
§ 371 (c)(1),
(2), (4) Date: Dec. 27, 2012

(87) PCT Pub. No.: WO2012/007998
PCT Pub. Date: Jan. 19, 2012

(65) Prior Publication Data
US 2013/0101914 A1    Apr. 25, 2013

(51) Int. Cl.
*H01M 8/02* (2006.01)
*H01M 8/10* (2006.01)
*H01M 8/04* (2006.01)

(52) U.S. Cl.
CPC ........ *H01M 8/04104* (2013.01); *H01M 8/0258* (2013.01); *H01M 8/04089* (2013.01); *H01M 8/1004* (2013.01); H01M 2008/1095 (2013.01); Y02E 60/50 (2013.01)
USPC ............................ 429/457; 429/446; 429/480

(58) Field of Classification Search
CPC  H01M 8/0247; H01M 8/0258; H01M 8/0265
USPC .......................................... 429/446, 480, 457
See application file for complete search history.

(56) References Cited

U.S. PATENT DOCUMENTS

2002/0192530 A1*  12/2002  Kabumoto et al. ............. 429/38
2007/0298308 A1*  12/2007  Yamamoto et al. ............. 429/34
2008/0292938 A1   11/2008  Perry et al.

FOREIGN PATENT DOCUMENTS

| CN | 101366130 A | | 2/2009 |
|---|---|---|---|
| JP | A-11-16591 | | 1/1999 |
| JP | A-11-154523 | | 6/1999 |
| JP | A-2004-335147 | | 11/2004 |
| JP | A-2005-85626 | | 3/2005 |
| JP | A-2005-141979 | | 6/2005 |
| JP | 2006004808 A | * | 1/2006 |
| JP | A-2006-4702 | | 1/2006 |
| JP | A-2006-127770 | | 5/2006 |
| JP | 2006331916 A | * | 12/2006 |
| JP | A-2008-123707 | | 5/2008 |
| JP | 2009129813 A | * | 6/2009 |
| JP | 2010129347 A | * | 6/2010 |

* cited by examiner

*Primary Examiner* — Gregg Cantelmo
(74) *Attorney, Agent, or Firm* — Oliff PLC

(57) ABSTRACT

An anode separator of a fuel cell forms: a plurality of gas flow channels arranged in parallel to let a fuel gas flow to an MEA; a supply passage configured to supply the plurality of gas flow channels with the fuel gas; and a recovery passage configured to recover the fuel gas from the plurality of gas flow channels. The plurality of gas flow channels include: a gas flow channel connects the supply passage and the recovery passage; and a gas flow channel having the supply passage side blocked.

7 Claims, 9 Drawing Sheets

FUEL CELL

TECHNICAL FIELD

The present invention relates to a fuel cell that electrochemically generates electric power using reactive gases, and more specifically to gas flow channels provided inside the fuel cell to let the reactive gases flow through.

BACKGROUND ART

In a known configuration of a fuel cell, a plurality of membrane electrode assemblies (hereinafter also referred to as "MEA"), each obtained by forming electrode layers on both surfaces of an electrode membrane, and separators provided to separate the respective membrane electrode assemblies from one another are stacked alternately, and each of the separators forms gas flow channels to let a reactive gas flow on the electrode plane of the MEA.

In one proposed structure of the fuel cell, a supply flow channel communicating with a supply side of the reactive gas and a recovery flow channel communicating with a recovery side of the reactive gas are formed separately in comb-like shapes that engage with each other, in order to enhance the power generation efficiency of the fuel cell by the shape of the gas flow channels (e.g., PTL1).

CITATION LIST

Patent Literatures

PTL1: JP 2005-85626A

SUMMARY

Technical Problem

The flow channel structure of such mutually-engaging comb-like shapes, however, has a problem that water produced in the supply flow channel during power generation moves to and accumulates in blocked edge areas of the comb-like supply flow channel. The accumulated water interferes with supply of the reactive gas to the MEA, thus decreasing the power generation capacity.

By taking into account the above problem, the object of the invention is to provide a technique of improving the power generation capacity of a fuel cell.

Solution to Problem

In order to solve at least part of the above problem, the invention provides various aspects and embodiments described below.

(First Aspect) According to a first aspect, there is provided a fuel cell including: a membrane electrode assembly obtained by forming electrode layers on both surfaces of an electrolyte membrane; and a plurality of gas flow channels arranged and arrayed on at least one surface of the membrane electrode assembly to let a reactive gas flow through the membrane electrode assembly from a supply side of the reactive gas to a recovery side of the reactive gas, wherein the plurality of gas flow channels include a first gas flow channel provided as a gas flow channel that connects the supply side with the recovery side and a second gas flow channel provided as a gas flow channel having the supply side blocked. The fuel cell of the first aspect moves the reactive gas from the supply side of the first gas flow channel through the membrane electrode assembly to the second gas flow channel, while preventing accumulation of produced water on the recovery side of the first gas flow channel. This improves the gas diffusion capacity of diffusing the reactive gas over the membrane electrode assembly on the supply side in the plurality of gas flow channels, while preventing decrease of the gas diffusion capacity caused by accumulation of the produced water on the recovery side in the plurality of gas flow channels. As a result, this improves the power generation capacity of the fuel cell.

(Second Aspect) According to a second aspect, there is provided the fuel cell of the first aspect, wherein the plurality of gas flow channels may be provided on an anode side of the membrane electrode assembly, and a fuel gas may be made to flow on the anode side in a direction opposed to flow of an oxidizing gas on a cathode side of the membrane electrode assembly. The fuel cell of the second aspect moves the fuel gas from the supply side of the first gas flow channel through the membrane electrode assembly to the second gas flow channel on the anode side, thereby enabling the fuel gas to be humidified with the moisture that is present at a relatively higher level in the downstream of the cathode side.

(Third Aspect) According to a third aspect, there is provided the fuel cell of either one of the first and the second aspects, wherein the membrane electrode assembly may include a diffusion layer configured to diffuse the reactive gas, which flows through the plurality of gas flow channels, over the electrode layer, and the recovery side of the diffusion layer may have greater gas permeability, which indicates a degree of permeation of the reactive gas, than the supply side of the diffusion layer. The fuel cell of the third aspect improves the gas diffusion capacity on the recovery side in the plurality of gas flow channels.

In the fuel cell of the third aspect, the thickness of a microporous layer on the recovery side of the diffusion layer may be less than the thickness of a microporous layer on the supply side of the diffusion layer. This readily provides the diffusion layer having the greater gas permeability on the recovery side than the gas permeability on the supply side.

In the fuel cell of the third aspect, the diffusion layer may include a first diffusion layer provided on the supply side and a second diffusion layer provided on the recovery side to have greater gas permeability than the first diffusion layer. This also readily provides the diffusion layer having the greater gas permeability on the recovery side than the gas permeability on the supply side.

In the fuel cell of the third aspect, the compression stress in the thickness direction on the recovery side of the diffusion layer may be set to be less than the compression stress on the supply side of the diffusion layer. This also readily provides the diffusion layer having the greater gas permeability on the recovery side than the gas permeability on the supply side.

(Fourth Aspect) According to a fourth aspect, there is provided the fuel cell of any one of the first to the third aspects, which may further include: a recovery passage arranged to recover the reactive gas from the plurality of gas flow channels; and a protrusion protruded on the recovery passage to cause a greater pressure loss with respect to the reactive gas flowing out of the first gas flow channel than a pressure loss with respect to the reactive gas flowing out of the second gas flow channel. The fuel cell of the fourth aspect makes the pressure on the recovery side of the first gas flow channel higher than the pressure on the recovery side of the second gas flow channel, so as to enable the reactive gas to move from the recovery side of the first gas flow channel through the membrane electrode assembly to the second gas flow channel. This improves the gas diffusion capacity on the recovery side in the plurality of gas flow channels.

(Fifth Aspect) According to a fifth aspect, there is provided the fuel cell of any one of the first to the fourth aspects, wherein the plurality of gas flow channels may be configured by alternately arranging the first gas flow channel and the second gas flow channel. The fuel cell of the fifth aspect homogeneously enables improvement of the gas diffusion capacity on the supply side and prevention of accumulation of the produced water on the recovery side in the plurality of gas flow channels.

(Sixth Aspect) According to a sixth aspect, there is provided the fuel cell of any one of the first to the fifth aspects, wherein the plurality of gas flow channels may further include a third gas flow channel provided as a gas flow channel having the recovery side blocked. The fuel cell of the sixth aspect enables the reactive gas to move from the recovery side of the third gas flow channel through the membrane electrode assembly to the second gas flow channel. This improves the gas diffusion capacity on the recovery side in the plurality of gas flow channels.

(Seventh Aspect) According to a seventh aspect, there is provided the fuel cell of the sixth aspect, wherein the plurality of gas flow channels may be configured by repeatedly arranging the first gas flow channel, the second gas flow channel, the third gas flow channel and the second gas flow channel in this sequence. The fuel cell of the seventh aspect homogeneously enables improvement of the gas diffusion capacity on both the supply side and the recovery side and prevention of accumulation of the produced water on the recovery side in the plurality of gas flow channels.

The present invention is not limited to the fuel cell but may be applicable to any of various other aspects, for example, a vehicle driven with using electric power of the fuel cell, a power generation system of supplying electric power of the fuel cell and a manufacturing method of the fuel cell. The present invention is not limited to the above aspects or embodiments but may be implemented by any of various other aspects or embodiments within the scope of the invention.

DESCRIPTION OF EMBODIMENTS

In order to further clarify the structure and the features of the invention described above, the following describes a fuel cell according to one application of the invention.

A. First Embodiment

Figure 1:
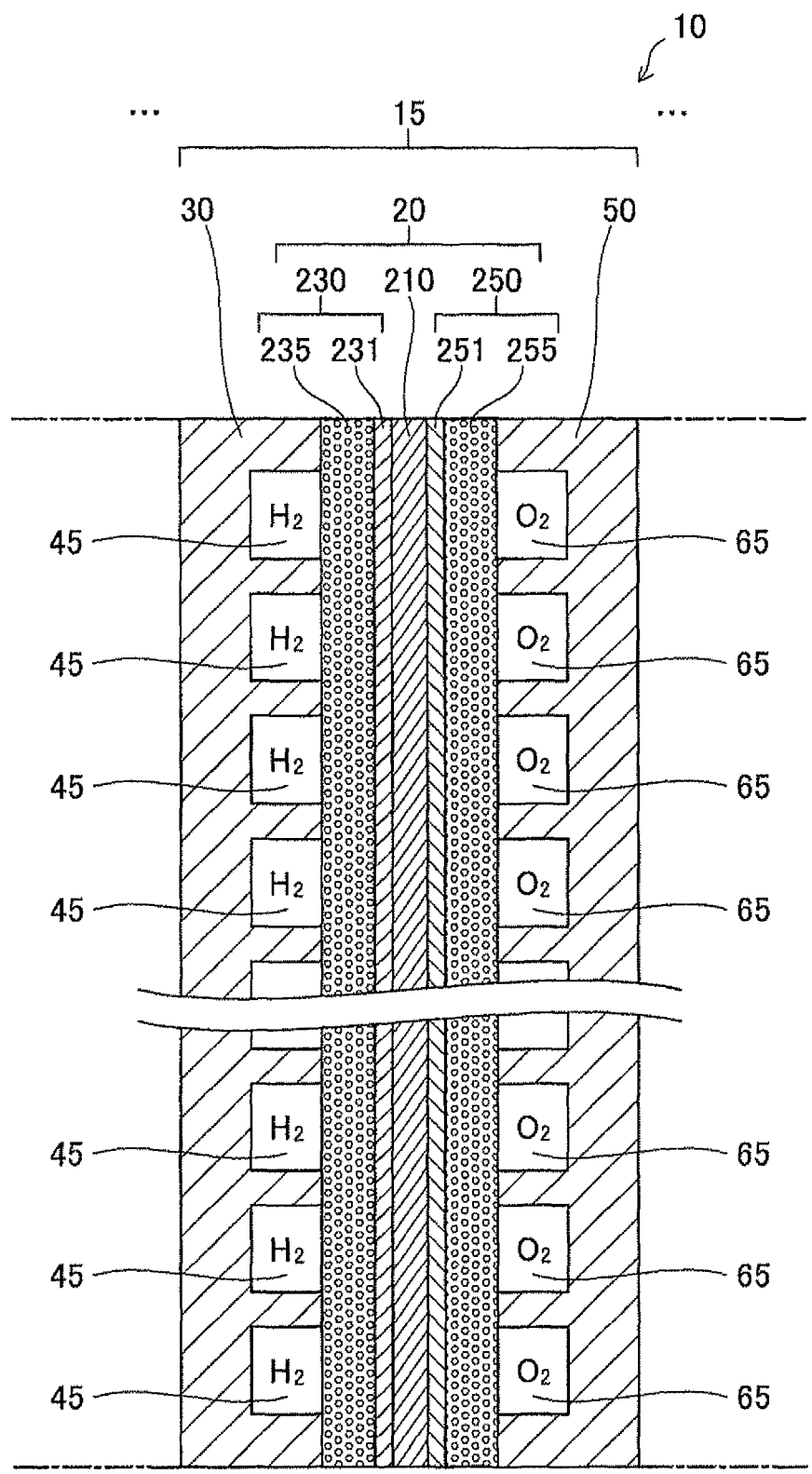
FIG. 1 illustrates the structure of a fuel cell.

FIG. 1 illustrates the structure of a fuel cell 10. The fuel cell 10 electrochemically generates electric power using reactive gases. According to this embodiment, the fuel cell 10 is a solid electrolyte fuel cell using a hydrogen-containing fuel gas and an oxygen-containing oxidizing gas as the reactive gases. The fuel gas used for the fuel cell 10 is hydrogen stored in a storage tank according to this embodiment, but may be hydrogen stored in metal hydrides or may be hydrogen obtained by reforming a hydrocarbon fuel according to other embodiments. The oxidizing gas used for the fuel cell 10 is the air intake from the ambient air according to this embodiment.

The fuel cell 10 has a plurality of cells 15 that performs an electrochemical reaction to directly take out electricity from the reactive gases and are stacked one another. Each cell 15 of the fuel cell 10 includes a membrane electrode assembly (MEA) 20, an anode separator 30 and a cathode separator 50. The MEA 20 is located between the anode separator 30 and the cathode separator 50.

Each MEA 20 of the fuel cell 10 includes an electrolyte membrane 210, an anode 230 and a cathode 250. The anode 230 of the MEA 20 includes an anode catalyst layer 231 and an anode diffusion layer 235, while the cathode 250 of the MEA 20 includes a cathode catalyst layer 251 and a cathode diffusion layer 255. The anode catalyst layer 231 and the anode diffusion layer 235 are stacked in this sequence to form the anode 230 on one surface of the electrolyte membrane 210. The cathode catalyst layer 251 and the cathode diffusion layer 255 are stacked in this sequence to form the cathode 250 on the other surface of the electrolyte membrane 210.

The electrolyte membrane 210 of the MEA 20 is a proton conductor having proton conductivity and is a perfluorosulfonic acid ion exchange membrane made of an ionomer resin according to this embodiment. The anode catalyst layer 231 and the cathode catalyst layer 251 of the MEA 20 are made of a material having gas permeability and electrical conductivity and supporting a catalyst (e.g., platinum or platinum alloy) for accelerating the electrochemical reaction of hydrogen with oxygen and are made of a carbon carrier with a platinum catalyst supported thereon according to this embodiment. The anode diffusion layer 235 and the cathode diffusion layer 255 of the MEA 20 are made of a material having gas permeability and electrical conductivity and may be made of a carbon porous material, such as carbon cloth or carbon paper. The gas permeability or the degree of permeation of the reactive gas through the anode diffusion layer 235 or through the cathode diffusion layer 255 is substantially uniform over the whole surface of the diffusion layer according to this embodiment.

The anode separator 30 of the fuel cell 10 has a plurality of gas flow channels 45 provided to let the fuel gas flow on the surface of the anode diffusion layer 235 of the MEA 20. The cathode separator 50 of the fuel cell 10 has a plurality of gas flow channels 65 provided to let the oxidizing gas flow on the surface of the cathode diffusion layer 255 of the MEA 20. The anode separator 30 and the cathode separator 50 have sufficient electrical conductivity to collect electricity generated by the MEA 20 and sufficient durability, heat resistance and gas impermeability to let the reactive gas flow on the MEA 20. The anode separator 30 and the cathode separator 50 are made of a carbon resin according to this embodiment, but may be made of stainless steel, titanium, a titanium alloy, or an electrically conductive ceramic material according to other embodiments. The anode separator 30 and the cathode separator 50 are separately provided according to this embodiment, but may be provided integrally according to another embodiment.

Figure 2:
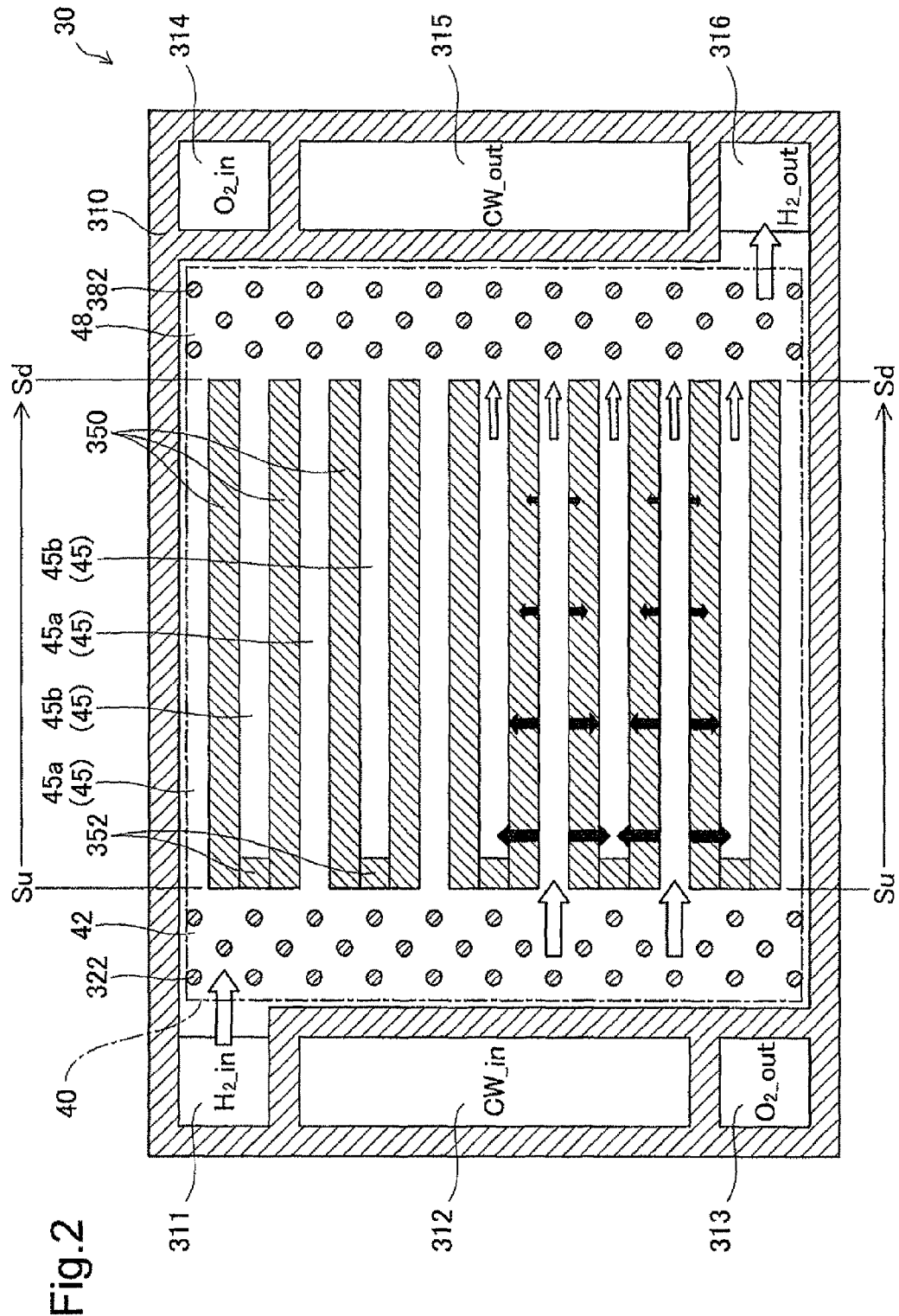
FIG. 2 illustrates the detailed structure of an anode separator.

FIG. 2 illustrates the detailed structure of the anode separator 30. The shape of the anode separator 30 viewed from the MEA 20-side is shown in FIG. 2. The anode separator 30 has an outer wall member 310, holes 311 to 316, a plurality of protrusions 322, a plurality of division walls 350, a plurality of blockages 352 and a plurality of protrusions 382. The outer wall member 310, the division walls 350 and the blockages 352 are in contact with the anode diffusion layer 235 of the MEA 20. The anode separator 30 forms a supply passage 42, a plurality of gas flow channels 45, and a recovery passage 48 as the flow paths parted by these elements. The shape of the anode separator 30 viewed from the MEA 20-side is a rectangle according to this embodiment. In FIG. 2, the outer wall member 310, the protrusions 322, the division walls 350, the blockages 352 and the protrusions 382 are hatched, in order to facilitate the recognition of the shapes of the respective flow paths formed by the anode separator 30.

The holes 311 to 316 of the anode separator 30 are through holes passing through the anode separator 30. The hole 311, the hole 312 and the hole 313 are arranged sequentially along one short side of the rectangular anode separator 30, while the hole 314, the hole 315 and the hole 316 are arranged sequentially along the other short side of the rectangular anode separator 30. According to this embodiment, the hole 311 serves as part of the flow channel, which the fuel gas to be supplied respectively to the plurality of cells 15 in the fuel cell 10 flows through. The hole 316 serves as part of the flow channel, which the fuel gas recovered respectively from the plurality of cells 15 in the fuel cell 10 flows through. According to this embodiment, the hole 314 serves as part of the flow channel, which the oxidizing gas to be supplied respectively to the plurality of cells 15 in the fuel cell 10 flows through. The hole 313 serves as part of the flow channel, which the oxidizing gas recovered respectively from the plurality of cells 15 in the fuel cell 10 flows through. According to this embodiment, the hole 312 serves as part of the flow channel, which cooling water to be supplied respectively to the plurality of cells 15 in the fuel cell 10 flows through. The hole 315 serves as part of the flow channel, which cooling water recovered respectively from the plurality of cells 15 in the fuel cell 10 flows through.

According to this embodiment, the anode separator 30 and the cathode separator 50 are provided as the same parts. An area of the cathode separator 50 corresponding to the hole 316 of the anode separator 30 serves as part of the flow channel, which the oxidizing gas to be supplied respectively to the plurality of cells 15 in the fuel cell 10 flows through. An area of the cathode separator 50 corresponding to the hole 311 of the anode separator 30 serves as part of the flow channel, which the oxidizing gas respectively recovered from the plurality of cells 15 in the fuel cell 10 flows through. According to this embodiment, the flow of the fuel gas through the plurality of gas flow channels 45 in the anode separator 30 is in a direction opposed to the flow of the oxidizing gas through the plurality of gas flow channels 65 in the cathode separator 50 across the MEA 20.

The outer wall member 310 of the anode separator 30 surrounds a power generation area 40 corresponding to an area of the MEA 20 for power generation, such that the power generation area 40 communicates with the hole 311 and with the hole 316. The plurality of division walls 350 of the anode separator 30 are provided as linear convexes that are extended across the power generation area 40 in a direction parallel to the long sides of the rectangular anode separator 30 and are arranged at equal intervals to be apart from one another. The plurality of gas flow channels 45 are accordingly formed between the outer wall member 31 and the division walls 350 and between the adjacent division walls 350. According to this embodiment, the power generation area 40 is provided as a rectangular area located in the middle of the anode separator 30. The supply passage 42, the plurality of gas flow channels 45 and the recovery passage 48 are formed in the power generation area 40 sequentially from the hole 311-side to the hole 316-side.

The supply passage 42 of the anode separator 30 is formed along one side or the hole 311-side of the rectangular power generation area 40 to supply the fuel gas introduced through the hole 311 in a distributive manner to the plurality of gas flow channels 45 while diffusing the fuel gas over the anode diffusion layer 235 of the MEA 20. According to this embodiment, the plurality of protrusions 322 are provided apart from one another on the supply passage 42 and protruded toward the MEA 20, in order to regulate the flow of the fuel gas.

The recovery passage 48 of the anode separator 30 is formed along one side or the hole 316-side of the rectangular power generation area 40 to discharge the fuel gas recovered from the plurality of gas flow channels 45 to the hole 316 while diffusing the fuel gas over the anode diffusion layer 235 of the MEA 20. According to this embodiment, the plurality of protrusions 382 are provided apart from one another on the recovery passage 48 and protruded toward the MEA 20, in order to regulate the flow of the fuel gas.

The plurality of gas flow channels 45 in the anode separator 30 are formed between the supply passage 42 and the recovery passage 48 in the rectangular power generation area 40, so as to let the fuel gas flow from an upstream side Su or the supply passage 42-side toward a downstream side Sd or the recovery passage 48-side, while diffusing the fuel gas over the anode diffusion layer 235 of the MEA 20. The plurality of gas flow channels 45 include gas flow channels 45a provided as first gas flow channels that connect the supply passage 42 with the recovery passage 48, and gas flow channels 45b provided as second gas flow channels that have the supply passage 42-side blocked by the blockages 352. In the description of the embodiment herein, the symbols "45a" and "45b" are used to indicate the gas flow channels 45a and the gas flow channels 45b in a distinguishable manner, while the symbol "45" is used to collectively indicate the gas flow channels 45a and 45b.

According to this embodiment, the gas flow channel 45 has the substantially fixed channel cross-section area from the upstream side Su to the downstream side Sd. The plurality of gas flow channels 45 are configured by alternately arranging the gas flow channel 45a and the gas flow channel 45b according to this embodiment. According to other embodiments, two or more of at least either one of the gas flow channel 45a and the gas flow channel 45b may be arranged consecutively. Although both the division walls 350 and the blockages 352 are formed integrally with the outer wall member 310 according to this embodiment, at least either one of the division walls 350 and the blockages 352 may be provided as separate members according to other embodiments. According to this embodiment, the blockages 352 are located on the supply passage 42-side end of the division walls 350. This is, however, not restrictive, but the blockages 352 may be located at any position on the supply passage 42-side from the middle of the division walls 350.

In FIG. 2, the flow of the fuel gas flowing along the power generation area 40 is shown by the open arrows, and the flows of the fuel gas passing through the division walls 350 and flowing into the gas flow channels 45b are shown by the closed arrows. The gas flow channels 45a connect the supply passage 42 with the recovery passage 48, so that the water produced in the gas flow channels 45a during power generation is not accumulated in the gas flow channels 45a but is discharged to the recovery passage 48. The flow of the fuel gas is blocked by the blockages 352 on the supply passage 42-side of the gas flow channels 45b, so that the fuel gas flows from the gas flow channels 45a across the anode diffusion layer 235 of the MEA 20, passes through the division walls 350 and flows into the gas flow channels 45b.

Figure 3:
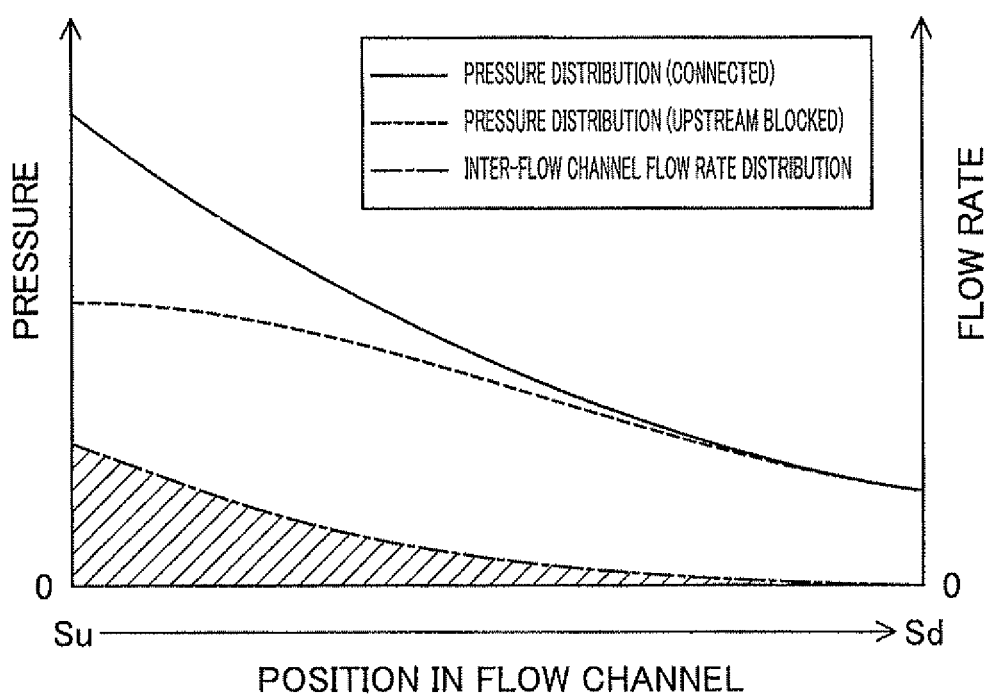
FIG. 3 illustrates the characteristics of gas flow channels according to a first embodiment.

FIG. 3 illustrates the characteristics of the gas flow channels 45 according to the first embodiment. More specifically, FIG. 3 shows pressure distributions and an inter-flow channel flow rate distribution in the gas flow channels 45, with the position in the gas flow channel 45 between the upstream side Su and the downstream side Sd as the abscissa and the pressure or the flow rate of the fuel gas as the ordinate. The pressure distribution (connected) in FIG. 3 indicates a pressure distribution of the fuel gas flowing through the gas flow channels 45a. The pressure distribution (upstream blocked) in FIG. 3 indicates a pressure distribution of the fuel gas flowing through the gas flow channels 45b. The inter-flow channel flow rate distribution in FIG. 3 indicates the flow rate of the fuel gas moving from the gas flow channels 45a to the gas flow channels 45b.

As shown in FIG. 3, at the upstream side Su, the pressure in the gas flow channels 45a is higher than the pressure in the gas flow channels 45b having the blocked upstream side Su. The pressure in the gas flow channels 45a and the pressure in the gas flow channels 45b gradually decrease with decreasing their pressure difference toward the downstream side Sd and reach substantially the same pressure value at the downstream side Sd. The inter-flow channel flow rate distribution from the gas flow channels 45a to the gas flow channels 45b gradually decreases from the upstream side Su toward the downstream side Sd according to the pressure difference between the gas flow channels 45a and the gas flow channels 45b.

The fuel cell 10 of the first embodiment described above enables the reactive gas to move from the supply passage 42-side of the gas flow channels 45a across the MEA 20 to the gas flow channels 45b, while preventing accumulation of the produced water on the recovery passage 48-side of the gas flow channels 45a. This improves the gas diffusion capacity of diffusing the reactive gas over the MEA 20 on the supply passage 42-side of the plurality of gas flow channels 45, while preventing decrease of the gas diffusion capacity caused by accumulation of the produced water on the recovery passage 48-side of the plurality of gas flow channels 45. As a result, this improves the power generation capacity of the fuel cell 10.

The plurality of gas flow channels 45 are configured by alternately arranging the gas flow channel 45a and the gas flow channel 45b. This homogeneously enables improvement of the gas diffusion capacity on the supply passage 42-side and prevention of accumulation of the produced water on the recovery passage 48-side in the plurality of gas flow channels 45.

The plurality of gas flow channels 45 are arranged, such that the fuel gas flows on the anode side of the MEA 20 in a direction opposed to the flow of the oxidizing gas on the cathode side of the MEA 20. Moving the fuel gas on the anode side from the supply passage 42-side of the gas flow channels 45a across the anode diffusion layer 235 to the gas flow channels 45b accordingly enables the fuel gas to be humidified with the moisture that is present at the relatively high level in the downstream on the cathode side.

B. Second Embodiment

Figure 4:
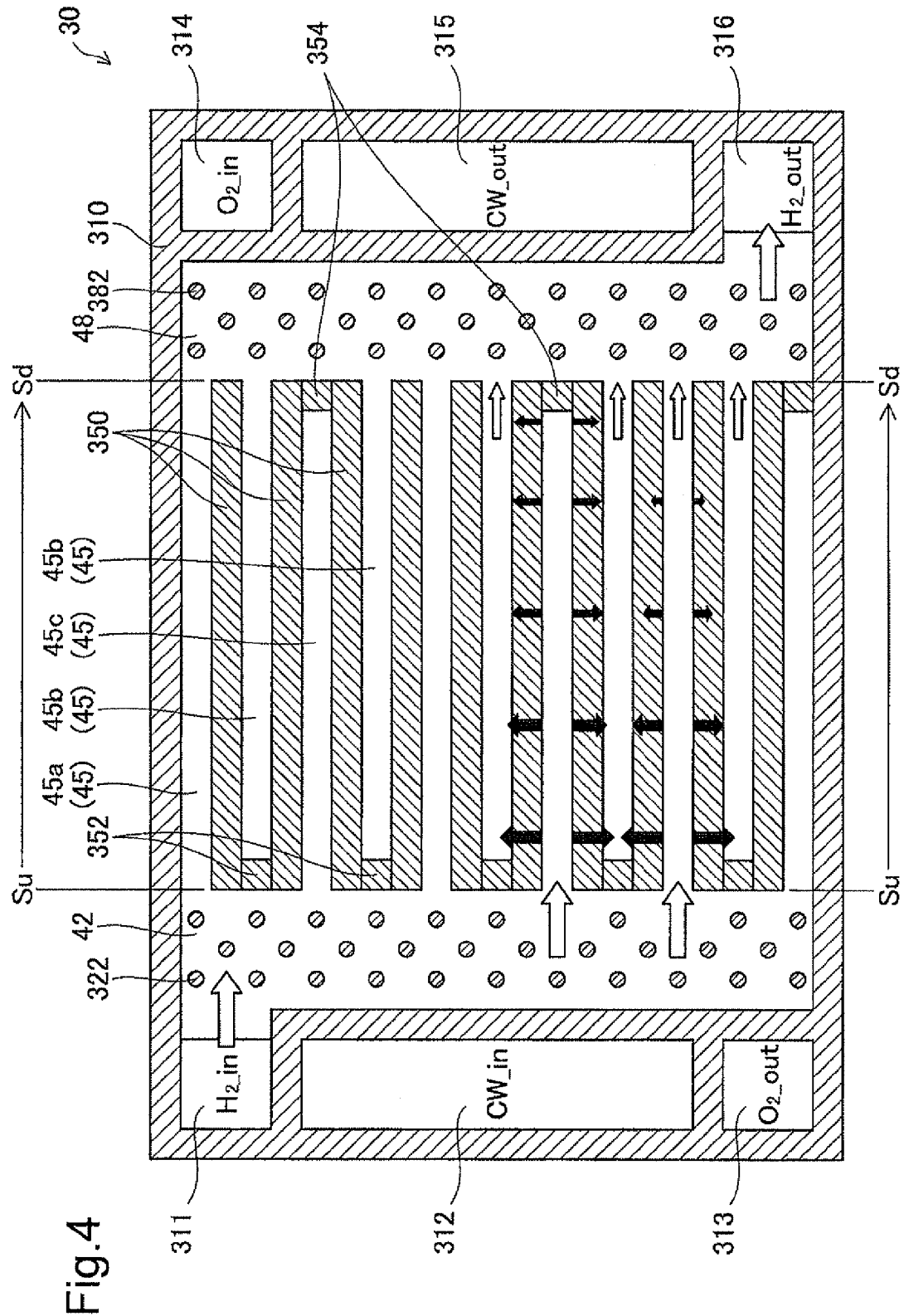
FIG. 4 illustrates the detailed structure of the anode separator according to a second embodiment.

A fuel cell 10 of a second embodiment is similar to that of the first embodiment, except the different configuration of the plurality of gas flow channels 45 in the anode separator 30. FIG. 4 illustrates the detailed structure of the anode separator 30 according to the second embodiment. Like FIG. 2, the shape of the anode separator 30 viewed from the MEA 20-side is shown in FIG. 4. The anode separator 30 of the second embodiment is similar to that of the first embodiment, except additionally providing blockages 354 that divide part of the plurality of gas flow channels 45. Like the blockages 352, the blockages 354 are in contact with the anode diffusion layer 235 of the MEA 20.

The gas flow channels 45 of the second embodiment include gas flow channels 45c provided as third gas flow channels that have the recovery passage 48-side blocked by the blockages 354, in addition to the gas flow channels 45a provided as first gas flow channels that connect the supply passage 42 with the recovery passage 48 and the gas flow channels 45b provided as second gas flow channels that have the supply passage 42-side blocked by the blockages 352. In the description of the embodiment herein, the symbols "45a", "45b" and "45c" are used to indicate the gas flow channels 45a, the gas flow channels 45b and the gas flow channels 45c in a distinguishable manner, while the symbol "45" is used to collectively indicate the gas flow channels 45a, 45b and 45c.

According to this embodiment, the gas flow channel 45 has the substantially fixed channel cross-section area from the upstream side Su to the downstream side Sd. The plurality of gas flow channels 45 are configured by repeatedly arranging the gas flow channel 45a, the gas flow channel 45b, the gas flow channel 45c and the gas flow channel 45b in this sequence according to this embodiment. According to other embodiments, two or more of at least any one of the gas flow channel 45a, the gas flow channel 45b and the gas flow channel 45c may be arranged consecutively, or the sequence of the arrangement may be changed. Although the division walls 350, the blockages 352 and the blockages 354 are formed integrally with the outer wall member 310 according to this embodiment, at least any one of the division walls 350, the blockages 352 and the blockages 354 may be provided as separate members. According to this embodiment, the blockages 354 are located on the recover passage 48-side end of the division walls 350. This is, however, not restrictive, but the blockages 354 may be located at any position on the recovery passage 48-side from the middle of the division walls 350.

In FIG. 4, the flow of the fuel gas flowing along the power generation area 40 is shown by the open arrows, and the flows of the fuel gas passing through the division walls 350 and flowing into the gas flow channels 45b are shown by the closed arrows. The gas flow channels 45a connect the supply passage 42 with the recovery passage 48, so that the water produced in the gas flow channels 45a during power generation is not accumulated in the gas flow channels 45a but is discharged to the recovery passage 48. The flow of the fuel gas is blocked by the blockages 352 on the supply passage 42-side of the gas flow channels 45b, so that the fuel gas flows from the gas flow channels 45a across the anode diffusion layer 235 of the MEA 20, passes through the division walls 350 and flows into the gas flow channels 45b. The flow of the fuel gas is blocked by the blockages 354 on the recovery passage 48-side of the gas flow channels 45c, so that a greater amount of the fuel gas on the recovery passage 48-side of the gas flow channels 45c passes through the division walls 350 and flows into the gas flow channels 45b than the fuel gas on the recovery passage 48-side of the gas flow channels 45a.

Figure 5:
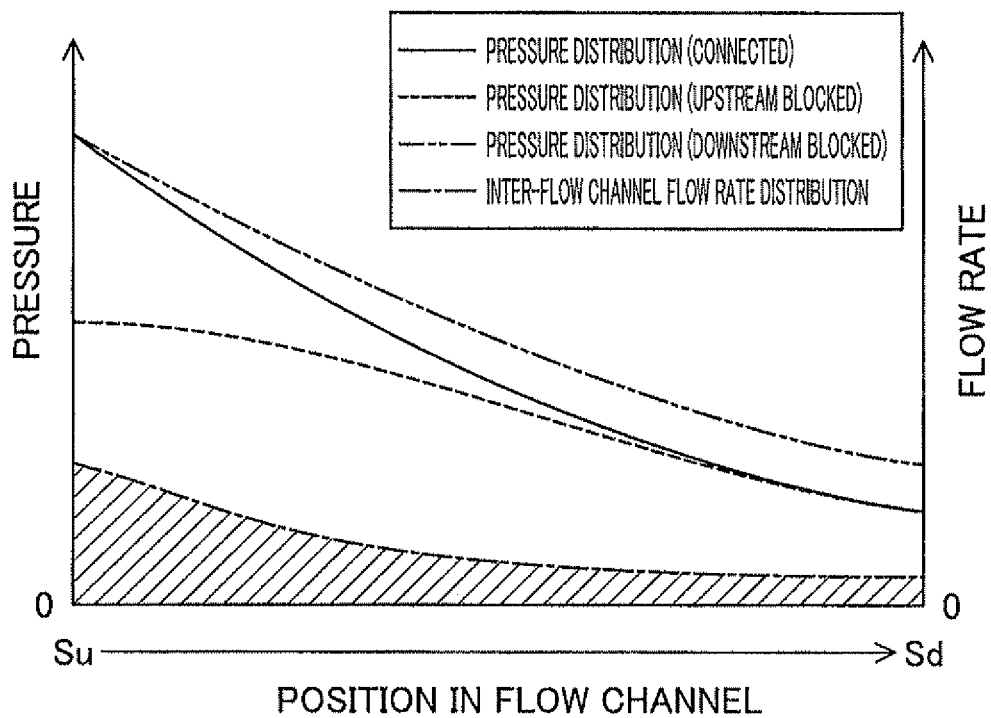
FIG. 5 illustrates the characteristics of the gas flow channels according to the second embodiment.

FIG. 5 illustrates the characteristics of the gas flow channels 45 according to the second embodiment. More specifically, FIG. 5 shows pressure distributions and an inter-flow channel flow rate distribution in the gas flow channels 45, with the position in the gas flow channel 45 between the upstream side Su and the downstream side Sd as the abscissa and the pressure or the flow rate of the fuel gas as the ordinate. The pressure distribution (connected) in FIG. 5 indicates a pressure distribution of the fuel gas flowing through the gas flow channels 45a. The pressure distribution (upstream blocked) in FIG. 5 indicates a pressure distribution of the fuel gas flowing through the gas flow channels 45b. The pressure distribution (downstream blocked) in FIG. 5 indicates a pressure distribution of the fuel gas flowing through the gas flow channels 45c. The inter-flow channel flow rate distribution in FIG. 5 indicates the flow rate of the fuel gas moving from the gas flow channels 45a and the gas flow channels 45c to the gas flow channels 45b.

As shown in FIG. 5, at the upstream side Su, the pressure in the gas flow channels 45a is higher than the pressure in the gas flow channels 45b having the blocked upstream side Su. The pressure in the gas flow channels 45a and the pressure in the gas flow channels 45b gradually decrease with decreasing their pressure difference toward the downstream side Sd and reach substantially the same pressure value at the downstream side Sd. The pressure in the gas flow channels 45c having the blocked downstream side Sd is equal to the pressure in the gas flow channels 45a at the upstream side Su, but gradually decreases with increasing the pressure difference from the pressure in the gas flow channels 45a toward the downstream side Sd to be higher than the pressure in the gas flow channels 45a and the pressure in the gas flow channels 45b at the downstream side Sd. The inter-flow channel flow rate distribution to the gas flow channels 45b has greater values on the downstream side Sd than the inter-flow channel flow rate distribution of the first embodiment, because of the pressure difference between the gas flow channels 45b and the gas flow channels 45c on the downstream side Sd.

Like the first embodiment, the fuel cell 10 of the second embodiment described above improves the gas diffusion capacity of diffusing the reactive gas over the MEA 20 on the supply passage 42-side of the plurality of gas flow channels 45, while preventing decrease of the gas diffusion capacity caused by accumulation of the produced water on the recovery passage 48-side of the plurality of gas flow channels 45. Additionally, the fuel cell 10 of the second embodiment improves the gas diffusion capacity on the recovery passage 48-side of the plurality of gas flow channels 45, compared with the first embodiment.

The plurality of gas flow channels 45 are configured by repeatedly arranging the gas flow channel 45a, the gas flow channel 45b, the gas flow channel 45c and the gas flow channel 45b in this sequence. This homogeneously enables improvement of the gas diffusion capacity on the supply passage 42-side and on the recovery passage 48-side and prevention of accumulation of the produced water on the recovery passage 48-side in the plurality of gas flow channels 45.

C. Third Embodiment

A fuel cell 10 of a third embodiment is similar to that of the first embodiment, except the variation in gas permeability of the anode diffusion layer 235 of the MEA 20. While the anode diffusion layer 235 of the first embodiment has substantially the same gas permeability over the whole surface, the anode diffusion layer 235 of the third embodiment has the higher gas permeability in an area corresponding to the recovery passage 48 of the anode separator 30 than the gas permeability in an area corresponding to the supply passage 42 of the anode separator 30.

According to this embodiment, the anode diffusion layer 235 having the higher gas permeability on the recovery passage 48-side than the gas permeability on the supply passage 42-side is obtained by forming the less thickness of a microporous layer, which is mainly composed of a water-repellent resin and an electrically conductive material, in the anode diffusion layer 235 on the recovery passage 48-side than the thickness of the microporous layer on the supply passage 48-side. According to another embodiment, the anode diffusion layer 235 having the higher gas permeability on the recovery passage 48-side than the gas permeability on the supply passage 42-side may be obtained by arranging a plurality of diffusion layer members having different gas permeabilities in an ascending order of gas permeability from the supply passage 42-side to the recovery passage 48-side to form the anode diffusion layer 235. According to yet another embodiment, the anode diffusion layer 235 having the higher gas permeability on the recovery passage 48-side than the gas permeability on the supply passage 42-side may be obtained by reducing the thickness of at least either one of the anode diffusion layer 235 and the anode separator 30 on the recovery passage 48-side to be smaller than the thickness on the supply passage 42-side and thereby making the compression stress in the thickness direction of the anode diffusion layer 235 on the recovery passage 48-side smaller than the compression stress on the supply passage 42-side.

Figure 6:
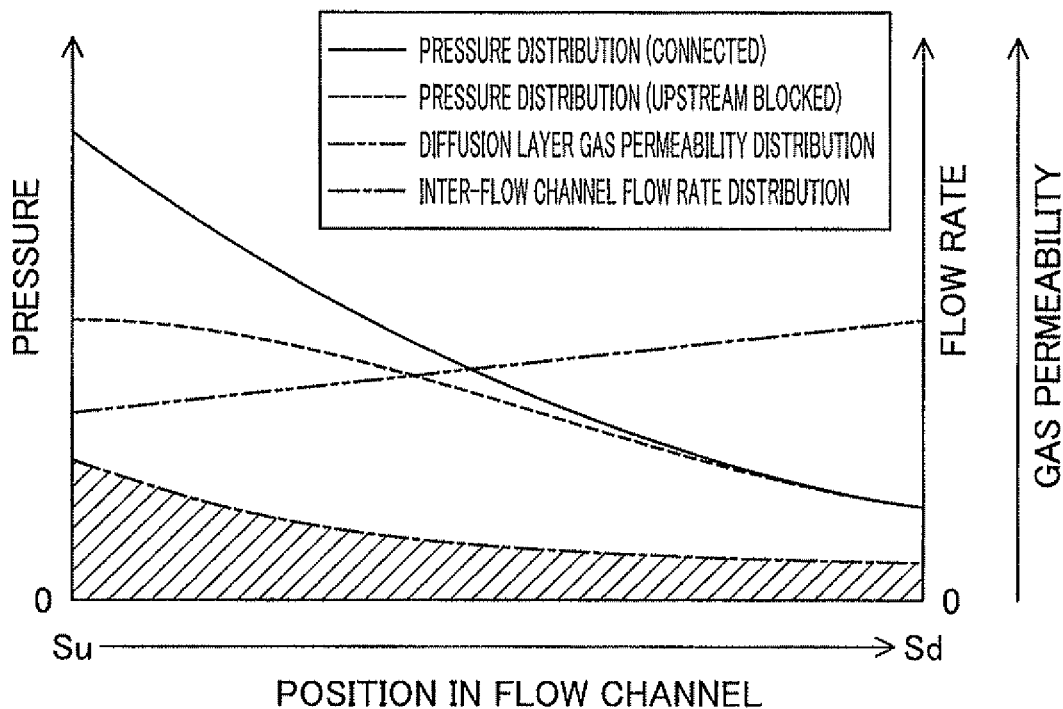
FIG. 6 illustrates the characteristics of the gas flow channels and an anode diffusion layer according to a third embodiment.

FIG. 6 illustrates the characteristics of the gas flow channels 45 and the anode diffusion layer 235 according to the third embodiment. More specifically, FIG. 6 shows pressure distributions and an inter-flow channel flow rate distribution in the gas flow channels 45 and a diffusion layer gas permeability distribution, with the position in the gas flow channel 45 between the upstream side Su and the downstream side Sd as the abscissa and the pressure or the flow rate of the fuel gas or the gas permeability as the ordinate. The pressure distribution (connected) in FIG. 6 indicates a pressure distribution of the fuel gas flowing through the gas flow channels 45a. The pressure distribution (upstream blocked) in FIG. 6 indicates a pressure distribution of the fuel gas flowing through the gas flow channels 45b. The diffusion layer gas permeability distribution in FIG. 6 indicates a gas permeability distribution of the anode diffusion layer 235. The inter-flow channel flow rate distribution in FIG. 6 indicates the flow rate of the fuel gas moving from the gas flow channels 45a to the gas flow channels 45b. As shown in FIG. 6, the pressure distributions in the gas flow channels 45a and in the gas flow channels 45b have the similar tendency to those of the first embodiment, while the gas permeability of the anode diffusion layer 235 gradually increases from the upstream side Su to the downstream side Sd. The inter-flow channel flow rate distribution to the gas flow channels 45b accordingly has greater values on the downstream side Sd than the inter-flow channel flow rate distribution of the first embodiment.

Like the first embodiment, the fuel cell 10 of the third embodiment described above improves the gas diffusion capacity of diffusing the reactive gas over the MEA 20 on the supply passage 42-side of the plurality of gas flow channels 45, while preventing decrease of the gas diffusion capacity caused by accumulation of the produced water on the recovery passage 48-side of the plurality of gas flow channels 45. Additionally, the fuel cell 10 of the third embodiment improves the gas diffusion capacity on the recovery passage 48-side of the plurality of gas flow channels 45, compared with the first embodiment.

D. Fourth Embodiment

Figure 7:
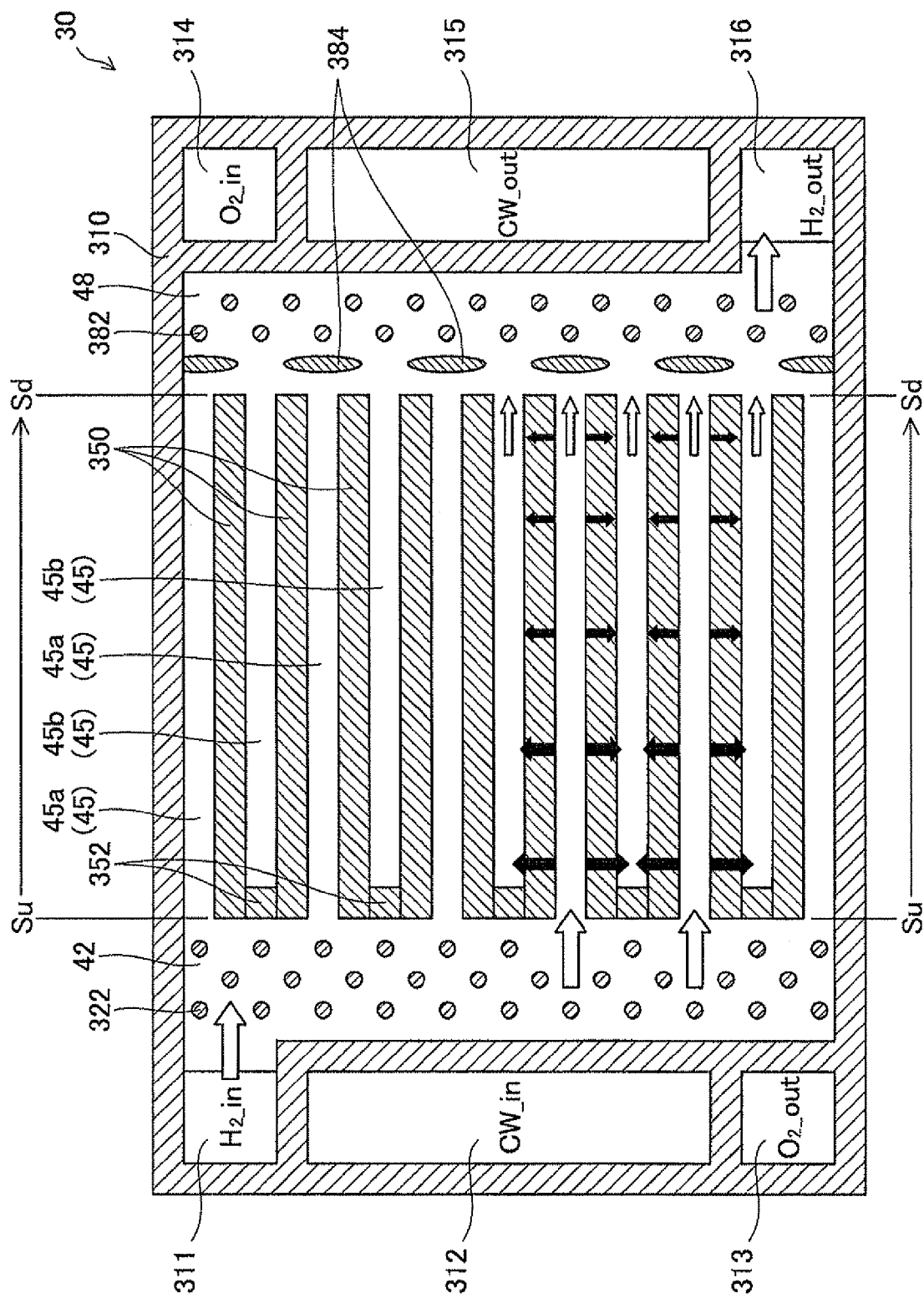
FIG. 7 illustrates the detailed structure of the anode separator according to a fourth embodiment.

A fuel cell 10 of a fourth embodiment is similar to that of the first embodiment, except the different arrangement of the recovery passage 48 in the anode separator 30. FIG. 7 illustrates the detailed structure of the anode separator 30 according to the fourth embodiment. Like FIG. 2, the shape of the anode separator 30 viewed from the MEA 20-side is shown in FIG. 7. The anode separator 30 of the fourth embodiment is similar to that of the first embodiment, except additionally providing protrusions 384 on the recovery passage 48. The protrusions 384 of the anode separator 30 causes a greater pressure loss with respect to the fuel gas flowing out of the gas flow channels 45a than the pressure loss with respect to the fuel gas flowing out of the gas flow channels 45b. According to this embodiment, each of the protrusions 384 is arranged on an extended line of the gas flow channel 45a in the recovery passage 48 and is formed in an elliptic cylindrical shape to be larger in size than the protrusions 382. The longitudinal direction of the protrusion 384 is orthogonal to the flow direction in the gas flow channel 45a, and the dimension of the protrusion 384 in the longitudinal direction is greater than the width of the gas flow channel 45a.

In FIG. 7, the flow of the fuel gas flowing along the power generation area 40 is shown by the open arrows, and the flows of the fuel gas passing through the division walls 350 and flowing into the gas flow channels 45b are shown by the closed arrows. The gas flow channels 45a connect the supply passage 42 with the recovery passage 48, so that the water produced in the gas flow channels 45a during power generation is not accumulated in the gas flow channels 45a but is discharged to the recovery passage 48. The flow of the fuel gas is blocked by the blockages 352 on the supply passage 42-side of the gas flow channels 45b, so that the fuel gas flows from the gas flow channels 45a across the anode diffusion layer 235 of the MEA 20, passes through the division walls 350 and flows into the gas flow channels 45b.

Figure 8:
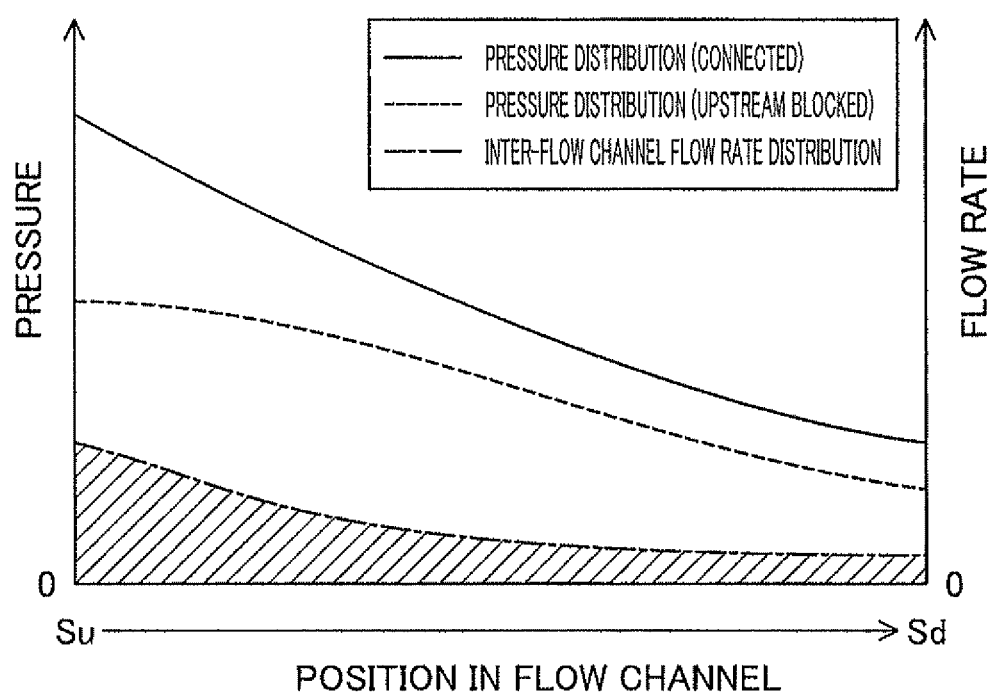
FIG. 8 illustrates the characteristics of the gas flow channels according to the fourth embodiment.

FIG. 8 illustrates the characteristics of the gas flow channels 45 according to the fourth embodiment. More specifically, FIG. 8 shows pressure distributions and an inter-flow channel flow rate distribution in the gas flow channels 45, with the position in the gas flow channel 45 between the upstream side Su and the downstream side Sd as the abscissa and the pressure or the flow rate of the fuel gas as the ordinate. The pressure distribution (connected) in FIG. 8 indicates a pressure distribution of the fuel gas flowing through the gas flow channels 45a. The pressure distribution (upstream blocked) in FIG. 8 indicates a pressure distribution of the fuel gas flowing through the gas flow channels 45b. The inter-flow channel flow rate distribution in FIG. 8 indicates the flow rate of the fuel gas moving from the gas flow channels 45a to the gas flow channels 45b.

As shown in FIG. 8, at the upstream side Su, the pressure in the gas flow channels 45a is higher than the pressure in the gas flow channels 45b having the blocked upstream side Su. The pressure in the gas flow channels 45a and the pressure in the gas flow channels 45b gradually decrease with decreasing their pressure difference toward the downstream side Sd. According to the third embodiment, the protrusions 384 provided on the recovery passage 48 makes the pressure on the recovery passage 48-side of the gas flow channels 45a greater than the pressure in the gas flow channels 45b. The inter-flow channel flow rate distribution from the gas flow channels 45a to the gas flow channels 45b accordingly has greater values on the downstream side Sd than the inter-flow channel flow rate distribution of the first embodiment.

Figure 9:
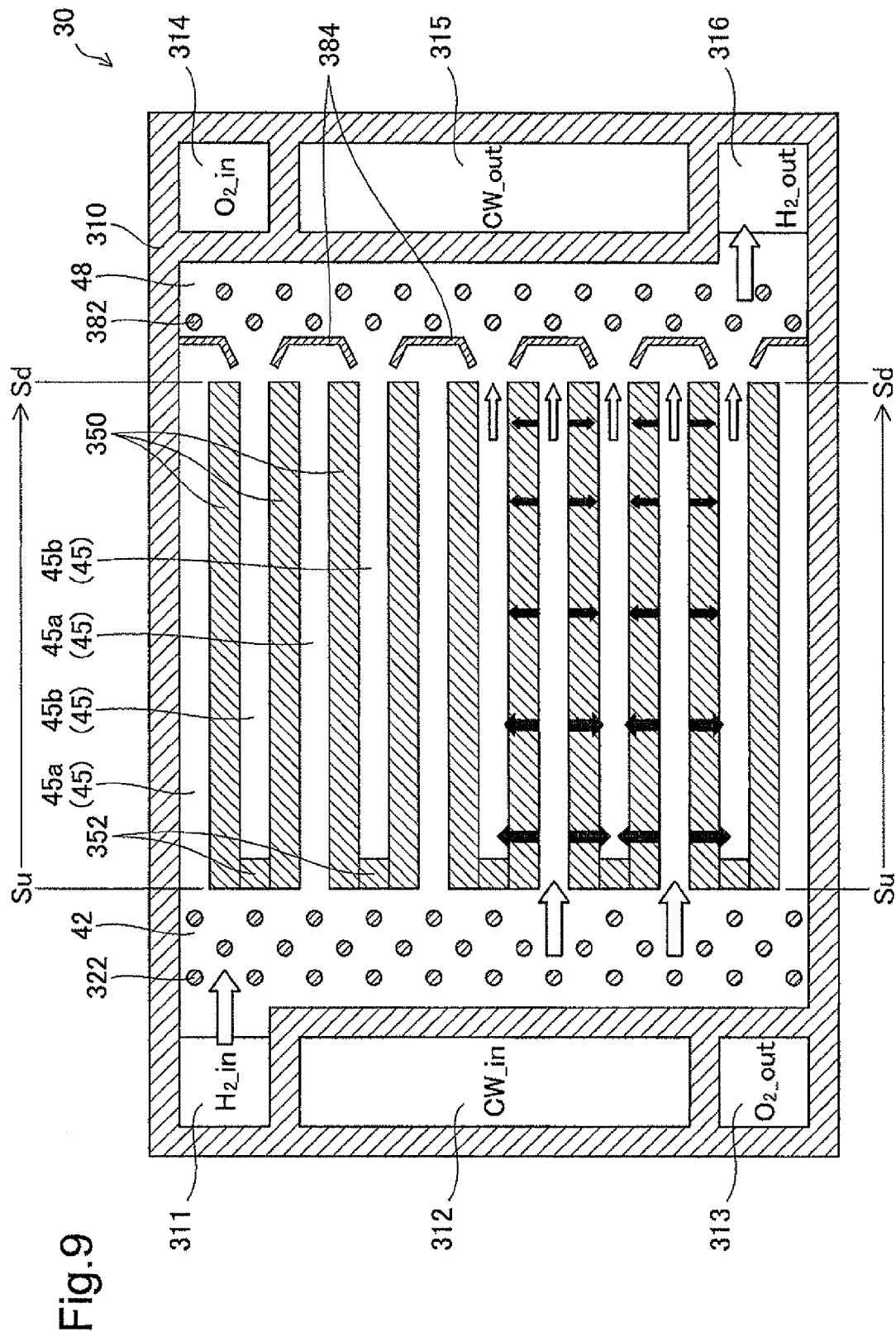
FIG. 9 illustrates the detailed structure of the anode separator according to a first modification of the fourth embodiment.

FIG. 9 illustrates the detailed structure of the anode separator 30 according to a first modification of the fourth embodiment. The anode separator 30 of the first modification is similar to the anode separator 30 of FIG. 7, except the protrusions 384 formed in a different shape. Each of the protrusions 384 of the first modification is arranged on an extended line of the gas flow channel 45a in the recovery passage 48 and is formed to have its wall surface orthogonal to the flow direction in the gas flow channel 45a with two ends bent respectively toward the adjacent gas flow channels 45b. Like the protrusions 384 of FIG. 7, the protrusions 384 of the first modification causes a greater pressure loss with respect to the fuel gas flowing out of the gas flow channels 45a than the pressure loss with respect to the fuel gas flowing out of the gas flow channels 45b.

Figure 10:
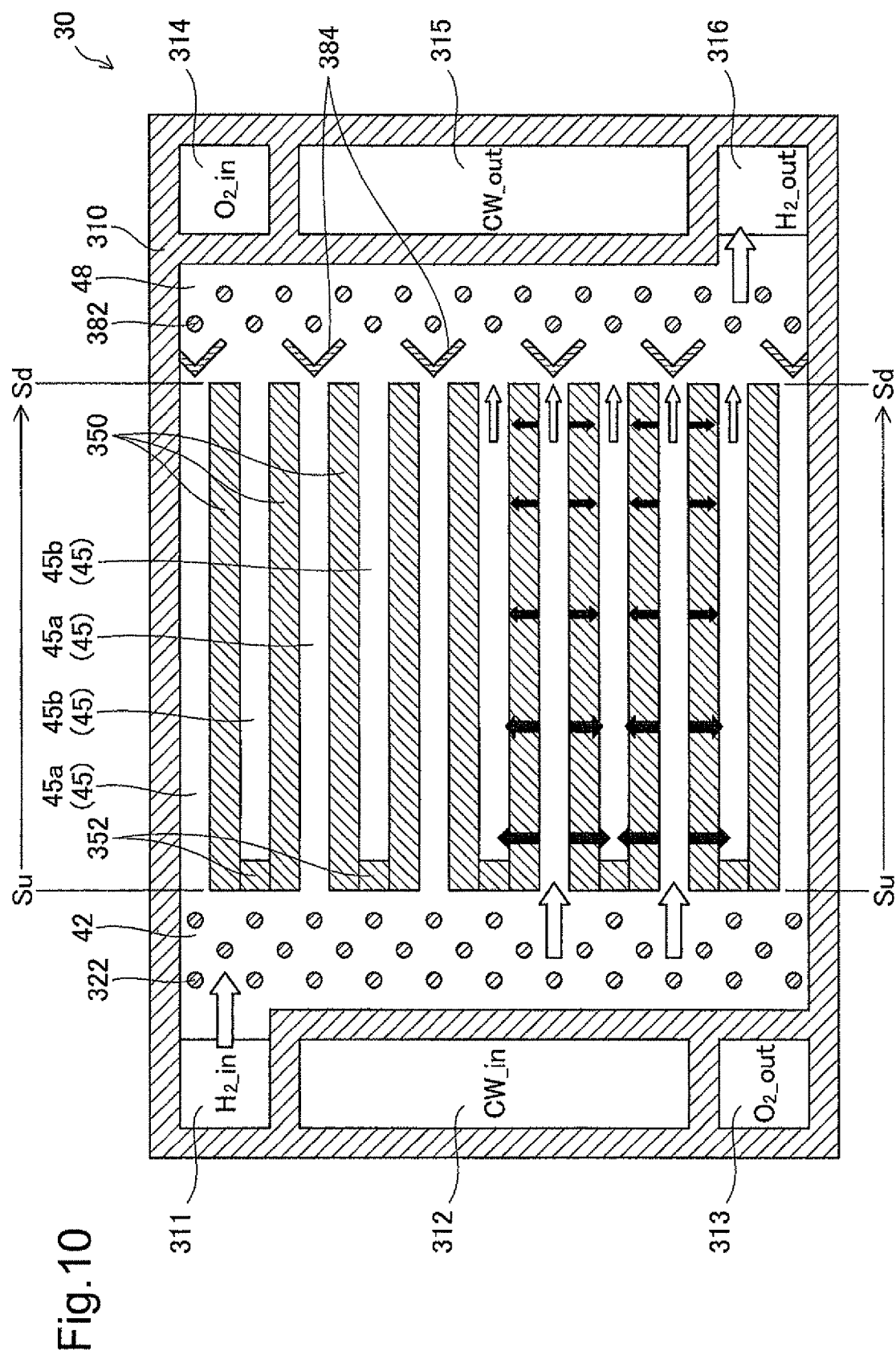
FIG. 10 illustrates the detailed structure of the anode separator according to a second modification of the fourth embodiment.

FIG. 10 illustrates the detailed structure of the anode separator 30 according to a second modification of the fourth embodiment. The anode separator 30 of the second modification is similar to the anode separator 30 of FIG. 7, except the protrusions 384 formed in a different shape. Each of the protrusions 384 of the second modification is arranged on an extended line of the gas flow channel 45a in the recovery passage 48 and is formed to have an apex of its "L-shaped" wall surface directed toward the gas flow channel 45a. Like the protrusions 384 of FIG. 7, the protrusions 384 of the second modification causes a greater pressure loss with respect to the fuel gas flowing out of the gas flow channels 45a than the pressure loss with respect to the fuel gas flowing out of the gas flow channels 45b.

Like the first embodiment, the fuel cell 10 of the fourth embodiment described above improves the gas diffusion capacity of diffusing the reactive gas over the MEA 20 on the supply passage 42-side of the plurality of gas flow channels 45, while preventing decrease of the gas diffusion capacity caused by accumulation of the produced water on the recovery passage 48-side of the plurality of gas flow channels 45. Additionally, the fuel cell 10 of the fourth embodiment improves the gas diffusion capacity on the recovery passage 48-side of the plurality of gas flow channels 45, compared with the first embodiment.

E. Other Embodiments

The foregoing has described some embodiments of the present invention. The invention is, however, not limited to the above embodiments, but a multiplicity of variations and modifications may be made to the embodiments without departing from the scope of the invention. For example, the anode diffusion layer 235 of the third embodiment may be applied to the fuel cell 10 of the second embodiment including the gas flow channels 45c having the recovery passage 48-side blocked. In another example, the protrusions 384 of the fourth embodiment may be applied to the fuel cell 10 of the second embodiment.

According to the above embodiments, the cathode separator 50 and the anode separator 50 are provided as the same parts having the similar flow path configuration. According to other embodiments, the flow path configuration of the cathode separator 50 may have the interlocked comb-like arrangement, may include flow channels made of a porous material, or may include flow channels arranged in parallel without any blockages. Interlocked comb-like gas flow channels may be provided additionally between the plurality of gas flow channels 45 and the supply passage 42 in any of the above embodiments.

The invention claimed is:

1. A fuel cell comprising:
    a membrane electrode assembly having electrode layers formed on both surfaces of an electrolyte membrane;
    a plurality of gas flow channels arranged and arrayed on at least one surface of the membrane electrode assembly to let a reactive gas flow through the membrane electrode assembly from a supply side of the reactive gas to a recovery side of the reactive gas;
    a supply passage configured to supply the reactive gas to the plurality of gas flow channels; and
    a recovery passage configured to recover the reactive gas from the plurality of gas flow channels,
    wherein the membrane electrode assembly includes a diffusion layer configured to diffuse the reactive gas, which flows through the plurality of gas flow channels, over the electrode layer, and
    wherein the plurality of gas flow channels include:
        a first gas flow channel provided as an unblocked gas flow channel that connects the supply passage with the recovery passage in substantially fixed channel cross-section area; and
        a second gas flow channel provided as a gas flow channel having the supply passage side blocked and connecting to the recovery passage.

2. The fuel cell according to claim 1, wherein
    the plurality of gas flow channels are provided on an anode side of the membrane electrode assembly, and
    a fuel gas is made to flow on the anode side in a direction opposed to flow of an oxidizing gas on a cathode side of the membrane electrode assembly.

3. The fuel cell according to claim 1, wherein the recovery side of the diffusion layer has greater gas permeability, which indicates a degree of permeation of the reactive gas, than the supply side of the diffusion layer.

4. The fuel cell system according to claim 1, further comprising:
    a protrusion protruded on the recovery passage to cause a greater pressure loss with respect to the reactive gas flowing out of the first gas flow channel than a pressure loss with respect to the reactive gas flowing out of the second gas flow channel.

5. The fuel cell system according to claim 1, wherein the plurality of gas flow channels are configured by alternately arranging the first gas flow channel and the second gas flow channel.

6. The fuel cell system according to claim 1, wherein the plurality of gas flow channels further include a third gas flow channel provided as a gas flow channel having the recovery passage side blocked and connecting to the supply passage.

7. The fuel cell according to claim 6, wherein the plurality of gas flow channels are configured by repeatedly arranging the first gas flow channel, the second gas flow channel, the third gas flow channel and the second gas flow channel in this sequence.

* * * * *